(12) United States Patent
Tregenza Dancer

(10) Patent No.: US 10,382,155 B2
(45) Date of Patent: *Aug. 13, 2019

(54) DATA PROCESSING

(71) Applicant: Metaswitch Networks Ltd, Enfield (GB)

(72) Inventor: Colin Tregenza Dancer, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,959

(22) Filed: Feb. 13, 2018

(65) Prior Publication Data

US 2018/0175957 A1 Jun. 21, 2018

Related U.S. Application Data

(63) Continuation of application No. 15/197,377, filed on Jun. 29, 2016, now Pat. No. 9,929,823, which is a (Continued)

(30) Foreign Application Priority Data

Aug. 28, 2013 (GB) .................................. 1315311.9

(51) Int. Cl.
*H04J 3/14* (2006.01)
*H04J 3/06* (2006.01)
(Continued)

(52) U.S. Cl.
CPC .......... *H04J 3/0632* (2013.01); *H04L 7/0041* (2013.01); *H04L 43/087* (2013.01)

(58) Field of Classification Search
None
See application file for complete search history.

(56) References Cited

U.S. PATENT DOCUMENTS 6,085,221 A 7/2000 Graf
6,658,027 B1 * 12/2003 Kramer ................ H04J 3/0632
370/516

(Continued)

FOREIGN PATENT DOCUMENTS

EP 1152573 A2 11/2001
EP 1182875 A2 2/2002
(Continued)

*Primary Examiner* — Kwang B Yao
*Assistant Examiner* — Juvena W Loo
(74) *Attorney, Agent, or Firm* — EIP US LLP

(57) ABSTRACT

In a telecommunications network including at least a user device and a network node separated by at least a packet-switched part of the telecommunications network, the user device including a primary jitter buffer having a constant packet play-out rate, the network node including a secondary jitter buffer, incoming packets destined for the user device are received and passed through the secondary jitter buffer of the network node downstream towards the primary jitter buffer of the user device. The departure times of packets passing through the secondary jitter buffer of the network node downstream towards the primary jitter buffer of the user device are monitored. On the basis of the monitoring and one or more known characteristics of the primary jitter buffer, an estimate of a current state of the primary jitter buffer is maintained. Operation of the secondary jitter buffer is dynamically controlled according to the maintained estimate.

17 Claims, 4 Drawing Sheets

Related U.S. Application Data continuation of application No. 14/194,470, filed on Feb. 28, 2014, now Pat. No. 9,407,386.

(51) Int. Cl.
*H04L 12/26* (2006.01)
*H04L 7/00* (2006.01)

(56) References Cited

U.S. PATENT DOCUMENTS

| | | | |
|---|---|---|---|
| 7,372,814 | B1 | 5/2008 | Chiruvolu et al. |
| 7,373,413 | B1 | 5/2008 | Nguyen et al. |
| 7,542,435 | B2 * | 6/2009 | Leon ............... H04L 29/06027 370/252 |
| 7,581,019 | B1 | 8/2009 | Amir et al. |
| 7,599,399 | B1 | 10/2009 | Bugenhagen |
| 7,930,341 | B1 | 4/2011 | Chayat |
| 8,281,356 | B2 | 10/2012 | Ohno et al. |
| 8,429,211 | B1 | 4/2013 | Shaffer et al. |
| 9,407,386 | B2 * | 8/2016 | Tregenza Dancer ............ H04L 43/087 |
| 9,929,823 | B2 * | 3/2018 | Tregenza Dancer ............ H04L 43/087 |
| 2002/0143973 | A1 | 2/2002 | Price |
| 2004/0062260 | A1 | 4/2004 | Raetz et al. |
| 2005/0235075 | A1 | 10/2005 | Dijkhof |
| 2006/0095612 | A1 * | 5/2006 | Fitzgerald ............... G06F 5/14 710/52 |
| 2007/0133619 | A1 | 6/2007 | Lee et al. |
| 2007/0276954 | A1 | 11/2007 | Chan et al. |
| 2009/0259756 | A1 | 10/2009 | Karlsson et al. |
| 2009/0285094 | A1 | 11/2009 | Straub et al. |
| 2011/0267999 | A1 | 11/2011 | Kuwahara |
| 2012/0169929 | A1 | 7/2012 | Plasberg et al. |
| 2013/0028088 | A1 * | 1/2013 | Do ............... H04L 1/0002 370/235 |
| 2013/0155853 | A1 | 6/2013 | Chen et al. |

FOREIGN PATENT DOCUMENTS

| | | |
|---|---|---|
| WO | 0036843 A1 | 6/2000 |
| WO | 200193516 A1 | 12/2001 |

* cited by examiner

DATA PROCESSING

CROSS-REFERENCE TO RELATED APPLICATIONS

This application is a continuation under 35 U.S.C. § 120 of U.S. application Ser. No. 15/197,377, filed Jun. 29, 2016, which is a continuation of U.S. application Ser. No. 14/194,470, filed Feb. 28, 2014, which claims priority to United Kingdom Application No. 1315311.9, filed on Aug. 28, 2013. Each of the above-referenced patent applications is incorporated by reference in its entirety.

BACKGROUND OF THE INVENTION

Field of the Invention

The present disclosure relates to processing data in a packet-switched network. In particular, but not exclusively, the present disclosure relates to processing voice data in a packet-switched network.

Description of the Related Technology

Real-time multimedia communication over packet-switched networks, for example using Internet Protocol (IP), requires that a media stream is recorded at one end, sampled, split into small chunks, transmitted over a communications channel, received and played out at the receiver's end.

In an ideal world, the media packets are transmitted by the sender and received by the receiver at precisely the same rate, thus the receiver has an accurate reproduction of what the sender recorded.

In practice, however, there is a degree of variability in the transmission speed of each packet, due to the idiosyncrasies of the network through which the packets pass. This variance is called jitter, and it is considered an undesirable phenomenon. High levels of jitter will cause 'gaps' to appear in the media stream as perceived by the receiver; in an audio call, for example, this may be heard as a 'stuttering' or 'hiccupping' sound.

A common solution to this problem is to implement a jitter buffer. Jitter buffers store up packets as they arrive and then, after a short delay, play them out from the buffer at a constant rate. As long as the buffer is large enough, it can absorb jitter-induced gaps in the input stream, playing out its stored up packets such that no corresponding gap is present in the output stream.

FIG. 1 depicts normal operation of a jitter buffer 102 where a jittery input stream of packets 100 passes into jitter buffer 102 and then out of jitter buffer 102 to produce an output stream of packets 104. Jittery input stream 100 includes a burst of packets 106 which can be seen to cause jitter buffer 102 to start filling up 108. Jittery input stream 100 also includes a gap 110 containing no packets which can be seen to cause jitter buffer 102 to start emptying 112. In this case, the jitter buffer is able to absorb the burst and gap in the input stream such that the output stream contains a constant output (or 'play-out') packet rate 114.

If there is sufficiently high jitter on the input stream, then a given jitter buffer may become ineffective. Specifically, this will happen is there is a gap in the input stream that exceeds the jitter buffer's nominal capacity. In this case, the jitter buffer has played out all the packets it contains, and cannot therefore play out any more. The result is a noticeable and undesirable gap in the output media stream that is perceived by the receiver.

FIG. 2 depicts operation of a jitter buffer 102 where a gap in the output stream is caused by a depleted jitter buffer. As in FIG. 1, a jittery input stream of packets 100 passes into jitter buffer 102 and then out of jitter buffer 102 to produce an output stream of packets 104. Also as in FIG. 1, jittery input stream 100 includes a burst of packets 106 which can be seen to cause jitter buffer 102 to start filling up 108 and a gap 110 containing no packets which can be seen to cause jitter buffer 102 to start emptying 112. However, in this case, the size/length/duration of gap 110 exceeds the capacity of jitter buffer 102 such that jitter buffer 102 empties 116 and is unable to provide any further packets to play-out, resulting in a gap appearing 118 in output stream 104.

Gaps in the output media stream can be mitigated by increasing the size of the jitter buffer. However, increasing the size of the jitter buffer increases the transmission delay between sender and receiver, which can lead to undesirable effects (such as increased echo on the line). Further, the jitter buffer may be restricted (for example by hardware and/or software constraints) to a maximum size that is insufficient to absorb all the jitter on the stream. Still further, in the case of a network administrator, the jitter buffer in question may not be under their control, for example if it resides in a downstream piece of equipment.

It would therefore be desirable to provide improved measures for processing data in packet-switched networks.

SUMMARY

According to first embodiments, there is a method of processing data in a telecommunications network, the telecommunications network comprising at least a user device and a network node separated by at least a packet-switched part of the telecommunications network, the user device comprising a primary jitter buffer having a constant packet play-out rate, the network node comprising a secondary jitter buffer, the method comprising, at the network node: receiving incoming packets destined for the user device and passing the received packets through the secondary jitter buffer of the network node downstream towards the primary jitter buffer of the user device; monitoring the departure times of packets passing through the secondary jitter buffer of the network node downstream towards the primary jitter buffer of the user device; on the basis of the monitoring and one or more known characteristics of the primary jitter buffer, maintaining an estimate of a current state of the primary jitter buffer; dynamically controlling operation of the secondary jitter buffer according to the maintained estimate.

According to second embodiments, there is apparatus for use in processing data in a telecommunications network, the telecommunications network comprising at least a user device and a network node separated by at least a packet-switched part of the telecommunications network, the user device comprising a primary jitter buffer having a constant packet play-out rate, the network node comprising a secondary jitter buffer, the apparatus comprising at least one processor, and at least one memory including computer program code, the at least one memory and the computer program code being configured to, with the at least one processor, cause the apparatus at least to, at the network node: receive incoming packets destined for the user device and passing the received packets through the secondary jitter buffer of the network node downstream towards the primary jitter buffer of the user device; monitor the departure times of packets passing through the secondary jitter buffer of the network node downstream towards the primary jitter buffer of the user device; on the basis of the monitoring and one or more known characteristics of the primary jitter buffer, maintain an estimate of a current state of the primary jitter buffer; dynamically control operation of the secondary jitter buffer according to the maintained estimate.

According to third embodiments, there is a computer program product comprising a non-transitory computer-readable storage medium having computer readable instructions stored thereon, the computer readable instructions being executable by a computerized device to cause the computerized device to perform a method for use in processing data in a telecommunications network, the telecommunications network comprising at least a user device and a network node separated by at least a packet-switched part of the telecommunications network, the user device comprising a primary jitter buffer having a constant packet play-out rate, the network node comprising a secondary jitter buffer, the method comprising, at the network node: receiving incoming packets destined for the user device and passing the received packets through the secondary jitter buffer of the network node downstream towards the primary jitter buffer of the user device; monitoring the departure times of packets passing through the secondary jitter buffer of the network node downstream towards the primary jitter buffer of the user device; on the basis of the monitoring and one or more known characteristics of the primary jitter buffer, maintaining an estimate of a current state of the primary jitter buffer; dynamically controlling operation of the secondary jitter buffer according to the maintained estimate.

Further features of the disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
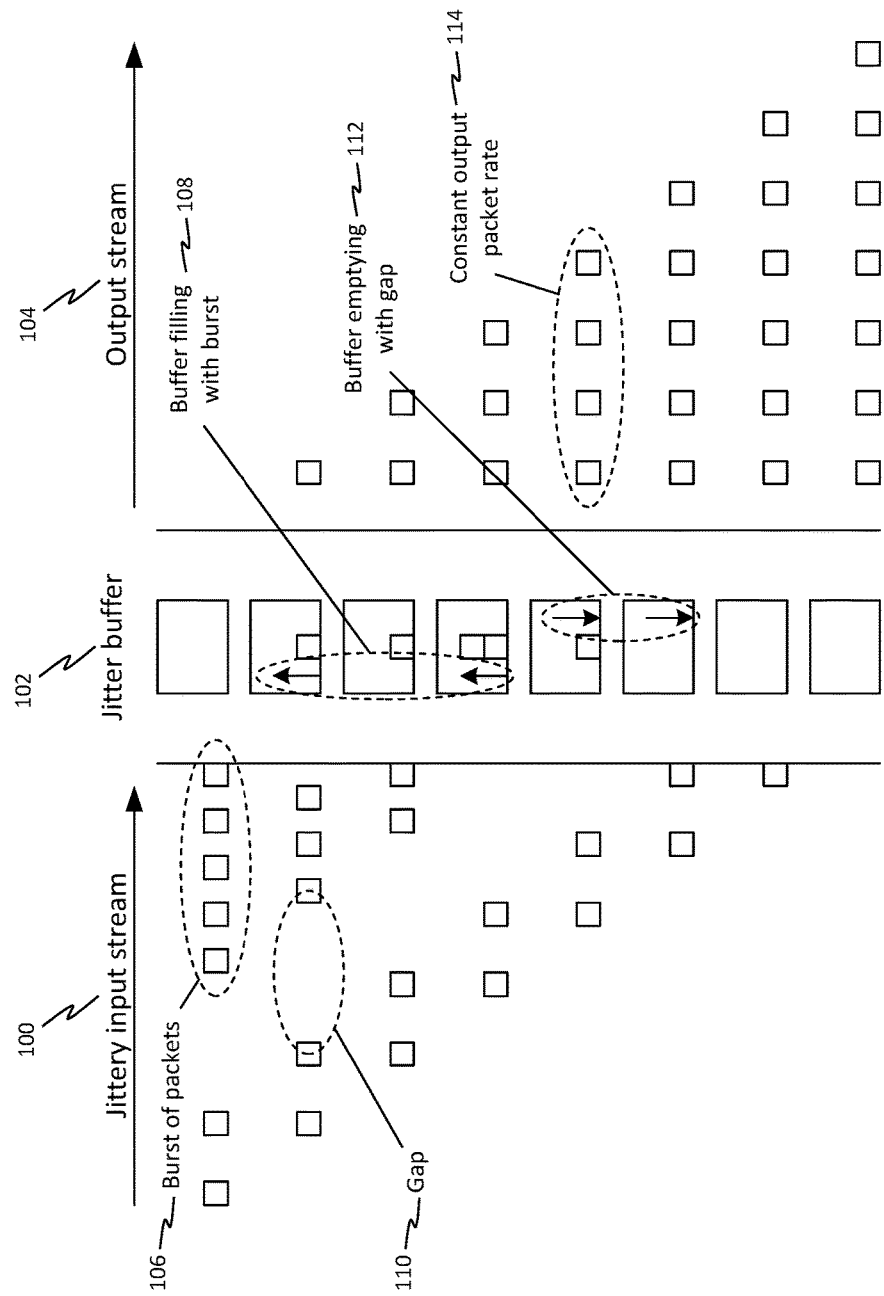
FIG. 1 depicts operation of a jitter buffer according to the prior art.
Figure 2:
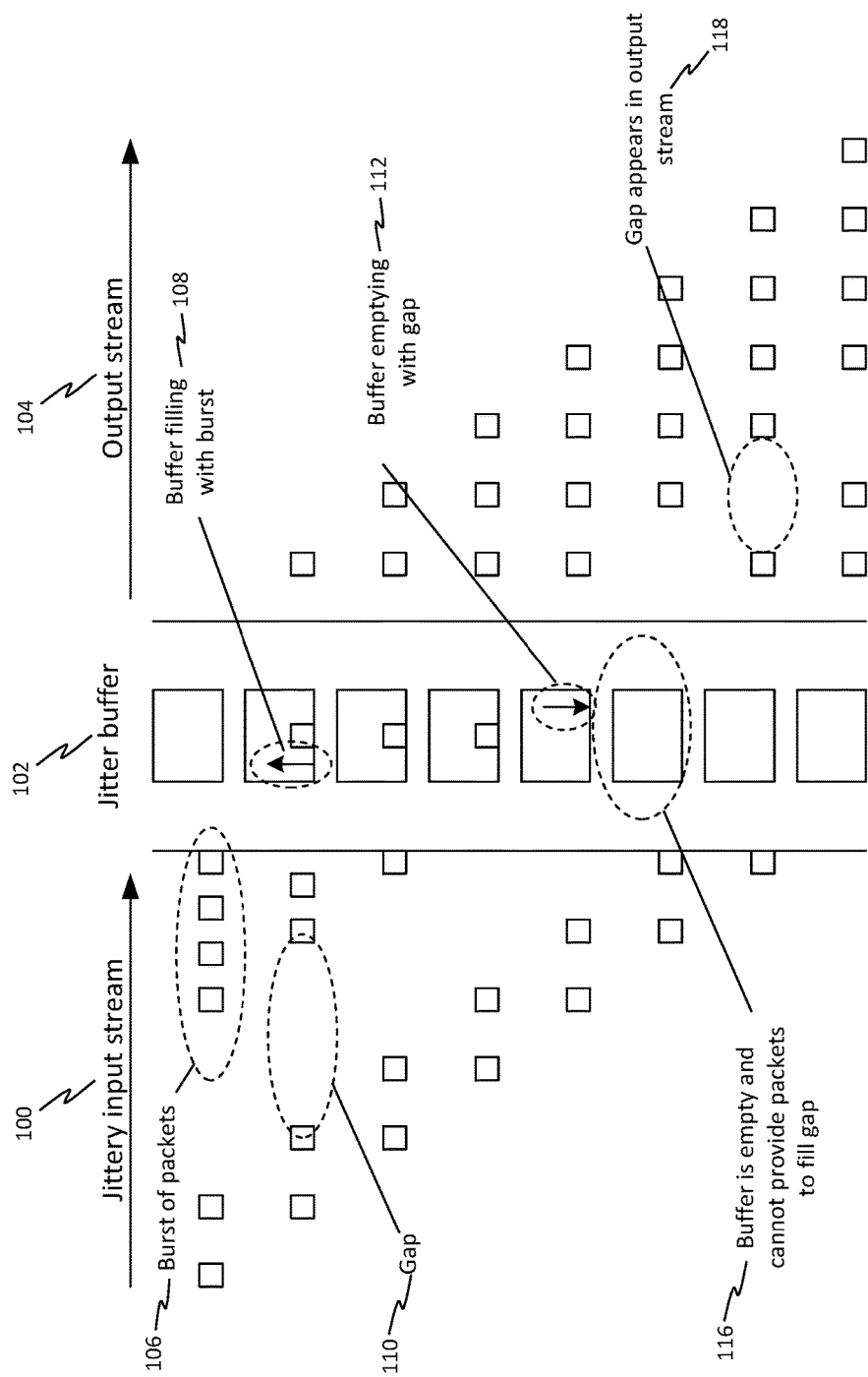
FIG. 2 depicts operation of a jitter buffer according to the prior art.
Figure 3:
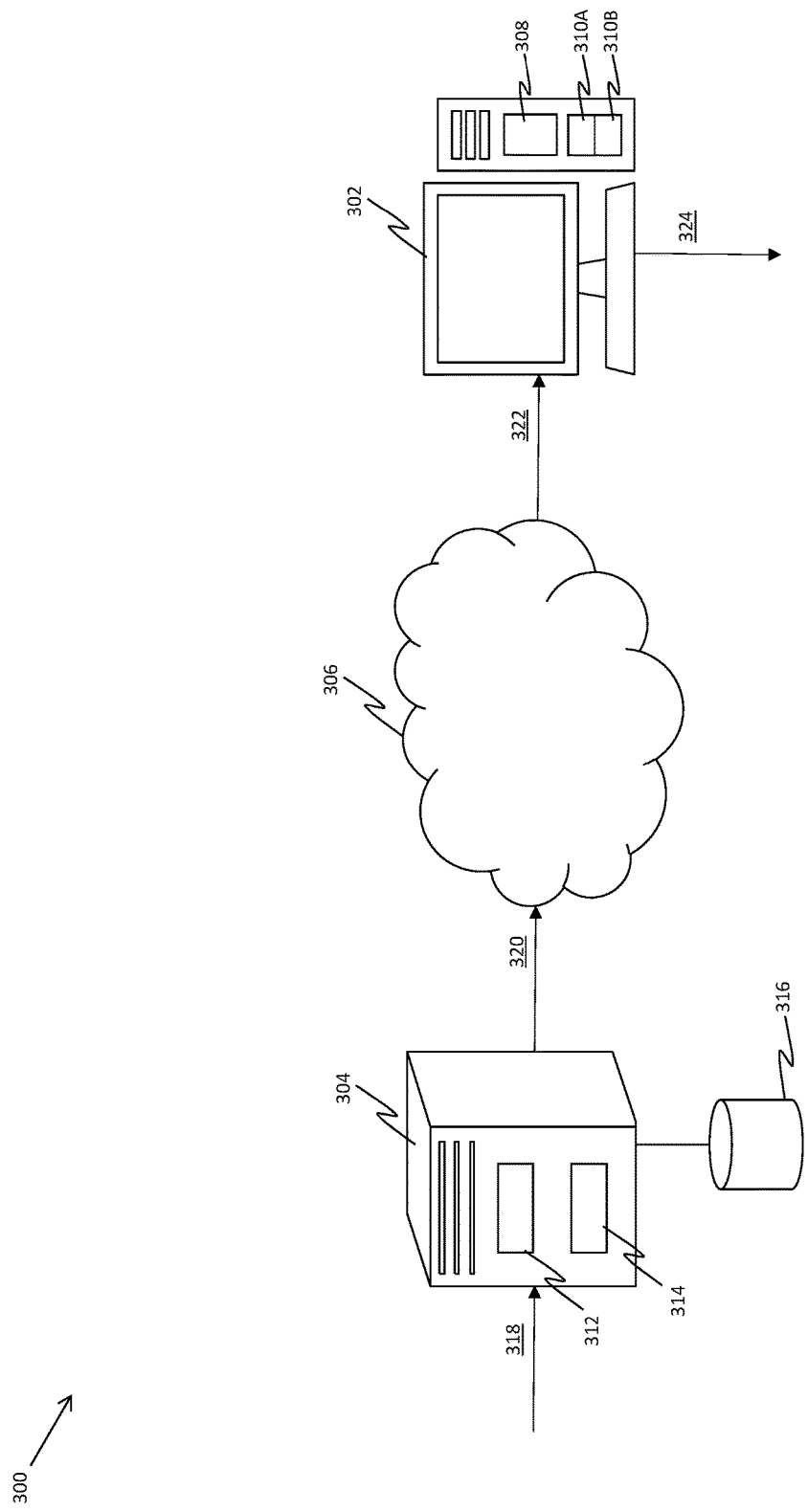
FIG. 3 shows a system diagram according to embodiments.

FIG. 3 shows a system diagram of a telecommunications network 300 according to embodiments. Telecommunications network 300 comprises at least a user device 302 and a network node 304 separated by at least a packet-switched part 306 of telecommunications network 300.

User device 302 (or 'endpoint device' or 'user equipment') comprises a primary jitter buffer 308 having a constant packet play-out rate. User device 302 also comprises a processing system comprising memory 310A and/or one or more processors 310B configurable to carry out various data processing tasks of embodiments. User device 302 could comprise any device capable of conducting communication (or 'media') sessions such as voice or video calls with one or more remote user devices (not shown) or network nodes (not shown). User device 302 could for example comprise a personal computer (PC), a mobile (or 'cellular') telephone, a voice over internet protocol (VoIP) telephone, a session initiation protocol (SIP) device, tablet, phablet, etc.

Network node 304 comprises a secondary jitter buffer 312 and processing systems and/or one or more processors 314 configurable to carry out various data processing tasks of embodiments. Network node comprises or has access to data storage 316 which could for example comprise internal memory, a remote database or suchlike. Network node could comprise any form of node or device located within telecommunications network 300 through which packets may pass, for example a router, server, switch, exchange, gateway, session border controller (SBC), softswitch, etc.

Telecommunications network 300 may also comprise other user devices (not shown) or network nodes (not shown) and one or more other network parts (not shown).

Embodiments introduce a secondary jitter buffer which is a second jitter buffer that is located upstream of the original (or 'primary') jitter buffer, and serves to effectively extend the primary jitter buffer. The secondary jitter buffer is located in the network earlier in the processing or call path (or 'upstream') of the primary jitter buffer.

Embodiments comprise measures (including methods, apparatus and computer software) for processing data in telecommunications network 300. Telecommunications network 300 comprises at least user device 302 and network node 304 separated by at least packet-switched part 306 of telecommunications network 300. User device 302 comprises a primary jitter buffer 380 having a constant packet play-out rate. Network node 304 comprises a secondary jitter buffer 312. Incoming packets destined for the user device are received 318 at network node 304 and passed 320 through secondary jitter buffer 312 downstream 320 towards primary jitter buffer 308 of user device 302. The packets then pass into packet-switched part 306 of telecommunications network 300 which is subject (or 'prone' or 'liable') to jitter, after which the arrive 322 at user device 302 where they are stored in primary jitter buffer 308. The packets are then played-out, for example at a constant play-out rate, to produce an output stream of packets 324. The packets may for example contain one or more of audio, video and multimedia data.

The departure times of packets passing through secondary jitter buffer 312 of network node 304 downstream towards primary jitter buffer 308 of user device 302 are monitored by network node 304.

On the basis of the monitoring and one or more known characteristics of primary jitter buffer 308, network node 304 maintains an estimate of a current state of primary jitter buffer 308.

Network node 304 then dynamically controls operation of secondary jitter buffer 312 according to the maintained estimate.

In embodiments, in response to the maintained estimate indicating that primary jitter buffer 308 is operating at a given nominal capacity, the dynamic controlling comprises passing packets downstream towards primary jitter buffer 308 of user device 302 at the constant packet play-out rate. In some such embodiments, the dynamic controlling comprises passing packets downstream towards primary jitter 308 buffer of user device 302 at the constant packet play-out rate without buffering the packets in secondary jitter buffer 312 such that the packets are not delayed by secondary jitter buffer 312.

In embodiments, in response to the maintained estimate indicating that primary jitter buffer 312 is operating at a capacity higher than a given nominal capacity or at a full capacity, the dynamic controlling comprises passing packets downstream towards primary jitter buffer 308 of user device 302 at a slower packet play-out rate than the constant packet play-out rate.

In embodiments, in response to the maintained estimate indicating that primary jitter buffer 308 is operating at a capacity lower than a given nominal capacity, the dynamic controlling comprises passing packets downstream towards primary jitter buffer 308 of user device 302 at a faster play-out rate than the constant play-out rate.

In embodiments, in response to the maintained estimate indicating that primary jitter buffer 308 is operating at an empty capacity, the dynamic controlling comprises: temporarily suspending passing of packets downstream towards primary jitter buffer 308 of user device 302 at the constant packet play-out rate; storing incoming packets destined to be passed towards primary jitter buffer 308 of user device 302 in secondary jitter buffer 312; secondary jitter buffer 312 has an initial capacity larger than the given nominal capacity of primary jitter buffer 308; once the initial capacity of secondary jitter buffer 312 is reached, passing a burst of packets downstream towards primary jitter buffer 308 of user device 302; the burst of packets is sufficient to return the operation of primary jitter buffer 308 to a given nominal capacity; and resuming passing of packets downstream towards primary jitter buffer 308 of user device 302 at the constant packet play-out rate.

Embodiments comprise, in response to detecting that secondary jitter buffer 312 is empty and the maintained estimate indicating that primary jitter buffer 308 is operating at an empty capacity, network node 304 performs the following: further temporarily suspending passing of packets downstream towards primary jitter buffer 308 of user device 302 at the constant packet play-out rate; increasing the capacity of secondary jitter buffer 312 to an enlarged capacity larger than the initial capacity of secondary jitter buffer 312; storing incoming packets destined to be passed towards primary jitter buffer 308 of user device 312 in the enlarged secondary jitter buffer; once the enlarged capacity of secondary jitter buffer 312 is reached, passing a further burst of packets downstream towards primary jitter buffer 308 of user device 302; the further burst of packets is sufficient to return the operation of primary jitter buffer 308 to a given nominal capacity; and resuming passing of packets downstream towards primary jitter buffer 308 of user device 302 at the constant packet play-out rate.

In embodiments, the one or more known characteristics comprise one or more of a given nominal capacity and a full capacity of primary jitter buffer 308.

In embodiments, the one or more known characteristics are associated with how primary jitter buffer 308 operates when operating at a full capacity.

In embodiments, the one or more known characteristics indicate that primary jitter buffer 308 discards all received packets when operating at a full capacity.

In embodiments, the one or more known characteristics indicate that primary jitter buffer 308 discards all received packets as well as sufficient packets to return its operation to a given nominal capacity when operating at a full capacity.

The one or more known characteristics of primary jitter buffer 308 may for example be stored in data storage 316 of network node 304.

Figure 4:
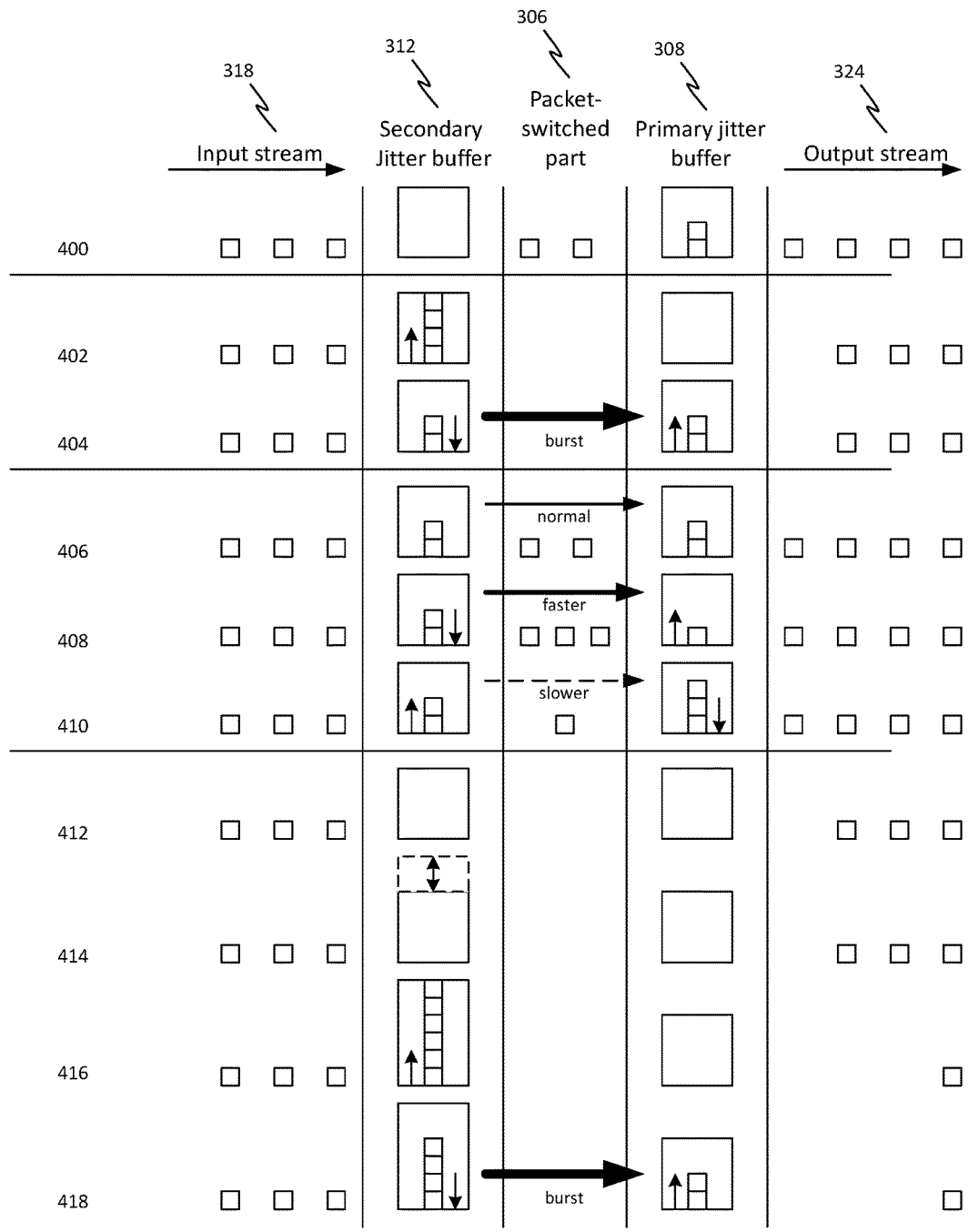
FIG. 4 depicts operation of a secondary jitter buffer according to embodiments.

FIG. 4 depicts operation of a secondary jitter buffer 312 according to embodiments. A jittery input stream of packets 318 passes through a secondary jitter buffer 312 and into a packet-switched part 306 of a telecommunications network 300. The packets then pass into primary jitter buffer 308 of a user device 302 where they are played-out to produce an output stream of packets 324.

Row 400 depicts normal operation embodiments where secondary jitter buffer 312 is empty. In such embodiments, network node 304 monitors the departure time of packets passing through it towards primary jitter buffer 308, and uses this in conjunction with knowledge of one or more characteristics of primary jitter buffer 308 (for example its nominal and/or maximum capacity) to derive an estimate of a current state of downstream primary jitter buffer 308, for example, how full it is. If network node 304 detects that downstream primary jitter buffer 308 is operating with adequate capacity, then it passes packets through. This means that delay is not introduced into the stream unnecessarily.

In row 402, network node 304 detects that downstream primary jitter buffer 308 is depleted it forms its own jitter buffer (secondary jitter buffer 312) by storing up enough packets to fill both the local secondary jitter buffer 312 and also downstream primary jitter buffer 308.

In row 404, network node 304 plays out a burst of packets from secondary jitter buffer 312 which is sufficient to fill downstream primary jitter buffer 308 to its nominal capacity.

The rate at which packets are subsequently played out from secondary jitter buffer 312 is based on the depth of primary jitter buffer 308 as monitored by network node 304:

If the current state of downstream primary jitter buffer 308 is detected (or 'estimated' or 'derived') as being at its nominal capacity, packets are played out from secondary jitter buffer 312 on a 1:1 basis with packet arrival.

If the current state of downstream primary buffer 308 is detected as approaching a depleted state, then the rate of packet play-out from secondary jitter buffer 312 is increased as per row 408.

If the current state of downstream primary buffer 308 is detected as approaching its maximum capacity, then the rate of packet play-out from secondary jitter buffer 312 is decreased as per row 410.

In row 412, network node 30 detects that both secondary jitter buffer 312 and primary jitter buffer 308 are empty and a further 'fill-up phase' is performed, this time with a larger secondary buffer capacity as per rows 414, 416 and 418 as follows:

In row 414, the capacity of secondary jitter buffer 312 is enlarged, for example by a predetermined percentage size or number of packets increase.

In row 416, received packets from input stream 318 are stored in enlarged secondary jitter buffer 312 until it is full.

In row 418, network node 304 plays out a burst of packets from enlarged secondary jitter buffer 312 which is sufficient to fill downstream primary jitter buffer 308 to its nominal capacity.

In embodiments, network node 304 models the current status of secondary jitter buffer 312 by maintaining a gauge of how full it believes primary jitter buffer 308 to be, for example in units of milliseconds worth of enqueued packets or suchlike. Parameters associated with the gauge may for example be stored in data storage 316 of network node 304.

In embodiments, the maintaining of an estimate of a current state of primary jitter buffer 308 comprises maintaining a gauge estimating how full primary jitter buffer 308 is. Some such embodiments comprise decrementing the gauge at the constant packet play-out rate of primary jitter buffer 308. Some such embodiments comprise incrementing the gauge every time a packet is passed through secondary jitter buffer 312 of network node 304 downstream towards primary jitter buffer 308 of user device 302.

Embodiments comprise incrementing the gauge when a given packet is passed through secondary jitter buffer 312 of network node 304 downstream towards primary jitter buffer 308 of user device 302 by the difference between a timestamp of the given packet and a timestamp of the previous packet passed downstream towards primary jitter buffer 308 of user device 302.

Embodiments comprise prohibiting the gauge falling below an empty capacity and above a full capacity of the primary jitter buffer. The gauge is thus not permitted to fall below zero (which represents the downstream buffer being empty), nor is it permitted to exceed the maximum capacity of the downstream buffer.

Embodiments comprise, when the passing of received packets through secondary jitter buffer 312 of network node 304 downstream towards primary jitter buffer 308 of user device 302 is first started, suspending decrementing of the gauge at the constant packet play-out rate of primary jitter buffer 308 until the gauge indicates that a given nominal capacity of primary jitter buffer 308 has been reached.

In embodiments, secondary jitter buffer 312 uses its knowledge of how primary jitter buffer 308 will behave in special circumstances. As one example, when the stream is first started, the primary jitter buffer may fill itself to its nominal capacity before forwarding packets, thus the secondary jitter buffer gauge should not start decrementing until it first indicates nominal capacity of the primary jitter buffer has been reached. As another example, if the primary jitter buffer is empty, then it obviously cannot become less full, thus the gauge should not be further decremented.

In embodiments, the behaviour of the primary buffer jitter when it reaches full capacity is known and is factored into the model. For example, the primary jitter buffer may simply discard subsequent packets when it is full. Or, the primary jitter buffer may discard those packets, plus enough packets to return it to nominal capacity.

In embodiments, the status of primary jitter buffer 308 is modelled accurately and several rules can be employed to implement different modes of operation of secondary jitter buffer 312. Parameters associated with the different modes of operation of secondary jitter buffer 312 may for example be stored in data storage 316 of network node 304. The different modes of operation of secondary jitter buffer 312 may for example include initial, monitor, fill and/or compensate modes, as follows:

Embodiments comprise an initial mode as the mode that secondary jitter buffer 312 starts in. In initial mode, packets are passed through secondary jitter buffer 312 without any local storage and the status of primary jitter buffer 308 is monitored. In embodiments employing a gauge for tracking how full primary jitter buffer 308 is, network node 304 does not decrement the primary jitter buffer status gauge in initial mode. Once the gauge reaches nominal capacity, the operation mode can be transitioned to monitor mode.

Embodiments comprise a monitor mode where network node 304 continues to pass packets through secondary jitter buffer 312 without storing them locally. The primary gauge is monitored, and if it reaches zero, the operation mode can be transitioned to fill mode.

Embodiments comprise a fill mode, where, upon entering this mode, the capacity of secondary jitter buffer 312 is enlarged. In fill mode, packets received are stored locally, and not forwarded downstream towards primary jitter buffer 308. Once the local secondary jitter buffer 312 reaches full capacity, network node 304 send out a burst of packets from secondary jitter buffer 312 downstream towards primary jitter buffer 308 which is sufficient to fill primary jitter buffer 308 to nominal capacity, and the operation mode can be transitioned to compensate mode.

Embodiments comprise a compensate mode where, if the primary jitter buffer gauge indicates that primary jitter buffer 308 is completely empty, the operation mode is transitioned back to fill mode. If the primary jitter buffer gauge indicates that primary jitter buffer 308 is near to, but not completely, empty (for example, if it is at less than half the nominal capacity), then network node 304 send packets downstream from secondary jitter buffer 312 at an accelerated rate (for example, twice as fast as normal). If the primary jitter buffer gauge indicates that primary jitter buffer 308 is near full (for example, more than half-way between the nominal and maximum capacities), then network node 304 send packets out from secondary jitter buffer 312 at a reduced rate (for example, half as fast as normal). If the primary jitter buffer gauge indicates that primary jitter buffer 308 is otherwise around nominal capacity, then network node 304 send packets out from secondary jitter buffer 312 at normal speed.

In embodiments, the dynamic controlling comprises disabling the secondary jitter buffer until such time that the maintained estimate indicates that the primary jitter buffer is operating at a capacity other than the given nominal capacity. Such embodiments allow the secondary jitter buffer to be (or remain) switched off until a problem with the primary jitter buffer is determined/detected. Such embodiments may for example correspond to embodiments where the secondary jitter buffer is operated in an initial mode.

In embodiments described above, network node 304 continually derives an estimate of the current status of primary jitter buffer 308 and dynamically controls operation of secondary jitter buffer 312 accordingly. In alternative embodiments, primary jitter buffer 308 signals its status back to network node 304. This could for example involve transmittal of a detailed status report (e.g. the exact current capacity). However, this could involve event-based status reporting (for example, 'I am empty', 'I am nearly empty', 'I am full', and so on). Such embodiments would be of particular value if special circumstances occur, for example, if the primary buffer hits its maximum capacity, it could tell the secondary buffer whether it chose to stay at that level, or whether it discarded packets down to a lower level.

Embodiments comprise network node 304 receiving, from user 302 device, status data associated with a current state of primary jitter buffer 308 of user device 302; in such embodiments, the maintaining is further carried out on the basis of the received status data.

In embodiments, the received status data indicates one or more of primary jitter buffer 308 operating at a given nominal capacity, primary jitter buffer 308 operating at a capacity higher than a given nominal capacity, primary jitter buffer 308 operating at a capacity lower than a given nominal capacity, primary jitter buffer 308 operating at an empty capacity, and primary jitter buffer 308 operating at a full capacity.

The above embodiments are to be understood as illustrative examples of the disclosure. Further embodiments of the disclosure are envisaged.

A slow shift from pure audio calls to multimedia calls, involving both audio and video streams can currently be seen. Embodiments can be applied to audio calls; however, embodiments are equally applicable to video calls, or indeed to any jitter-sensitive media. The future may paradoxically see an increase in noisy or unreliable networks, particularly as network infrastructure is extended to more physically remote or economically deprived regions of the world. In these cases, a mixture of long transmission lines, ad-hoc wireless networks and ageing technology may all contribute to higher levels of jitter on multimedia calls; embodiments can be integrated with all of these to improve the media quality.

Embodiments described above include a secondary jitter buffer which is located upstream of the primary jitter buffer in the network; alternative embodiments include a secondary jitter buffer located upstream of the primary jitter buffer in the same hardware as the primary jitter buffer.

Embodiments described above involve network node 304 controlling operation of the secondary jitter buffer and performing various associated data processing tasks. In alternative embodiments, such operations/tasks are performed by secondary jitter buffer 312 itself or a processer/module/part thereof.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of processing data in a telecommunications network, the telecommunications network comprising at least a network node and a user device, the user device comprising a primary jitter buffer having a constant packet play-out rate and a secondary jitter buffer located upstream of the primary jitter buffer in the user device, the method comprising, at the user device:
   receiving incoming packets destined for the primary jitter buffer;
   passing the received packets through the secondary jitter buffer downstream towards the primary jitter buffer;
   at least on the basis of one or more known characteristics of the primary jitter buffer, maintaining an estimate of a current state of the primary jitter buffer; and
   disabling the secondary jitter buffer until such time that the maintained estimate indicates that the primary jitter buffer is operating at a capacity other than a given nominal capacity,
   wherein, in response to the maintained estimate indicating that the primary jitter buffer is operating at an empty capacity, the method comprises:
   temporarily suspending passing of packets downstream towards the primary jitter buffer at the constant packet play-out rate;
   storing incoming packets destined to be passed towards the primary jitter buffer, wherein the secondary jitter buffer has an initial capacity larger than the given nominal capacity of the primary jitter buffer;
   once the initial capacity of the secondary jitter buffer is reached, passing a burst of packets downstream towards the primary jitter buffer, the burst of packets being sufficient to return the operation of the primary jitter buffer to the given nominal capacity; and
   resuming passing of packets downstream towards the primary jitter buffer at the constant packet play-out rate.

2. The method of claim 1, wherein, in response to the maintained estimate indicating that the primary jitter buffer is depleted, the method comprises:
   temporarily passing packets downstream towards the primary jitter buffer;
   storing at least some incoming packets destined to be passed towards the primary jitter buffer; and
   resuming passing of packets downstream towards the primary jitter buffer.

3. The method of claim 2, wherein the resumption of the passing of packets downstream towards the primary jitter buffer is at least on the basis of:
   the operation of the primary jitter buffer returning to the given nominal capacity;
   a given number of packets being stored in one or more of the primary jitter buffer and the secondary jitter buffer; and/or
   sufficient packets being passed downstream towards the primary jitter buffer.

4. The method of claim 2, wherein the resuming comprises resuming passing of packets downstream towards the primary jitter buffer at the constant play-out rate.

5. The method of claim 2, wherein the resuming comprises passing a burst of packets downstream towards the primary jitter buffer.

6. The method of claim 1, wherein, in response to the maintained estimate indicating that the primary jitter buffer is operating at a capacity lower than the given nominal capacity, the method comprises passing packets downstream towards the primary jitter buffer at a faster play-out rate than the constant play-out rate.

7. The method of claim 1, comprising receiving status data associated with the current state of the primary jitter buffer, wherein the maintaining is further carried out on the basis of the received status data.

8. The method of claim 7, wherein the received status data indicates one or more of the following:
   that the primary jitter buffer is operating at a capacity higher than the given nominal capacity;
   that the primary jitter buffer is operating at a capacity lower than the given nominal capacity;
   the primary jitter buffer is operating at an empty capacity; and
   that the primary jitter buffer is operating at a full capacity.

9. The method of claim 1, wherein the maintaining of the estimate of the current state of the primary jitter buffer comprises maintaining a gauge estimating how full the primary jitter buffer is.

10. The method of claim 9, comprising decrementing the gauge at the constant packet play-out rate of the primary jitter buffer.

11. The method of claim 1, wherein the one or more known characteristics of the primary jitter buffer comprise one or more of the given nominal capacity and a full capacity of the primary jitter buffer.

12. The method of claim 1, wherein the one or more known characteristics of the primary jitter buffer are associated with how the primary jitter buffer operates when operating at a full capacity.

13. The method of claim 1, wherein the one or more known characteristics of the primary jitter buffer indicate that the primary jitter buffer discards all received packets when operating at a full capacity.

14. The method of claim 1, wherein the one or more known characteristics of the primary jitter buffer indicate that the primary jitter buffer discards all received packets as well as sufficient packets to return its operation to the given nominal capacity when operating at a full capacity.

15. The method of claim 1, wherein the packets contain one or more of audio, video and multimedia data.

16. A method of processing data in a telecommunications network, the telecommunications network comprising at least a network node and a user device, the user device comprising a primary jitter buffer having a constant packet play-out rate and a secondary jitter buffer located upstream of the primary jitter buffer in the user device, the method comprising, at the user device:
  receiving incoming packets destined for the primary jitter buffer;
  passing the received packets through the secondary jitter buffer downstream towards the primary jitter buffer;
  at least on the basis of one or more known characteristics of the primary jitter buffer, maintaining an estimate of a current state of the primary jitter buffer;
  disabling the secondary jitter buffer until such time that the maintained estimate indicates that the primary jitter buffer is operating at a capacity other than a given nominal capacity, wherein the maintaining of the estimate of a current state of the primary jitter buffer comprises maintaining a gauge estimating how full the primary jitter buffer is;
  decrementing the gauge at the constant packet play-out rate of the primary jitter buffer; and
  incrementing the gauge when a given packet is passed downstream towards the primary jitter buffer by the difference between a timestamp of the given packet and a timestamp of the previous packet passed downstream towards the primary jitter buffer.

17. A user device configured to process data in a telecommunications network, the telecommunications network comprising at least a network node and a user device, the user device comprising a primary jitter buffer having a constant packet play-out rate and a secondary jitter buffer located upstream of the primary jitter buffer in the user device, the user device being configured to:
  receive incoming packets destined for the primary jitter buffer;
  pass the received packets through the secondary jitter buffer downstream towards the primary jitter buffer;
  at least on the basis of one or more known characteristics of the primary jitter buffer, maintain an estimate of a current state of the primary jitter buffer; and
  disable the secondary jitter buffer until such time that the maintained estimate indicates that the primary jitter buffer is operating at a capacity other than a given nominal capacity, wherein, in response to the maintained estimate indicating that the primary jitter buffer is operating at an empty capacity, the method comprises:
    temporarily suspending passing of packets downstream towards the primary jitter buffer at the constant packet play-out rate;
    storing incoming packets destined to be passed towards the primary jitter buffer, wherein the secondary jitter buffer has an initial capacity larger than the given nominal capacity of the primary jitter buffer;
    once the initial capacity of the secondary jitter buffer is reached, passing a burst of packets downstream towards the primary jitter buffer, the burst of packets being sufficient to return the operation of the primary jitter buffer to the given nominal capacity; and
    resuming passing of packets downstream towards the primary jitter buffer at the constant packet play-out rate.

* * * * *